No. 733,856. PATENTED JULY 14, 1903.
E. O. LOVELAND.
METHOD OF PREPARING EMBOSSING MOLDS.
APPLICATION FILED JULY 29, 1902.
NO MODEL.

Witnesses
E. O. Loveland, Inventor.
by C. A. Snow & Co.
Attorneys

THE NORRIS PETERS CO., PHOTO-LITHO., WASHINGTON, D. C.

No. 733,856. Patented July 14, 1903.

UNITED STATES PATENT OFFICE.

EMMETT OLIVER LOVELAND, OF KANSAS CITY, MISSOURI.

METHOD OF PREPARING EMBOSSING-MOLDS.

SPECIFICATION forming part of Letters Patent No. 733,856, dated July 14, 1903.

Application filed July 29, 1902. Serial No. 117,552. (No model.)

*To all whom it may concern:*

Be it known that I, EMMETT OLIVER LOVELAND, a citizen of the United States, residing at Kansas City, in the county of Jackson and State of Missouri, have invented a new and useful Method of Preparing Embossing-Molds, of which the following is a specification.

This invention is an improvement in the method of preparing molds, paritcularly such as are to be used in embossing paper, leather, wood, or other fibrous material or any soft pliable plastic substance.

Heretofore embossing-molds have been prepared by hand or machinery, and recently it has been the practice to copy objects or designs by taking an impression of the same in a plastic material, making an electroplate-shell therefrom and from this electroplate-shell taking a second electroplate-shell or matrix and backing this latter to produce the die or embossing-mold. This process is not only indirect, but expensive and tedious.

My improved method of preparing embossing-molds consists, essentially, in the following steps: first, taking an impression in a plastic material of the object or design to be reproduced; second, taking a counter impression in plastic material of the first impression; third, taking an electroplate-shell from said counter impression; fourth, removing said electroplate-shell from said counter impression and backing it for use as a matrix or die.

Figure 1:
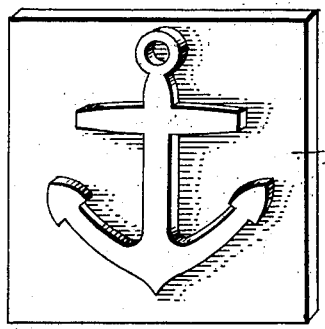
Figure 2:
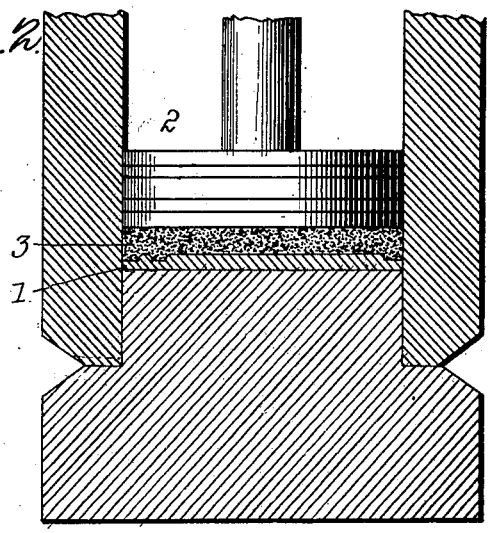
Figure 3:
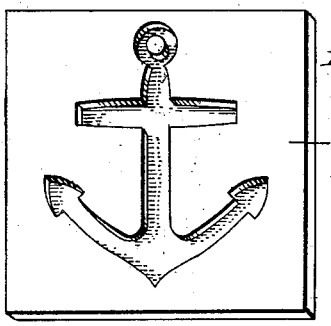
Figure 4:
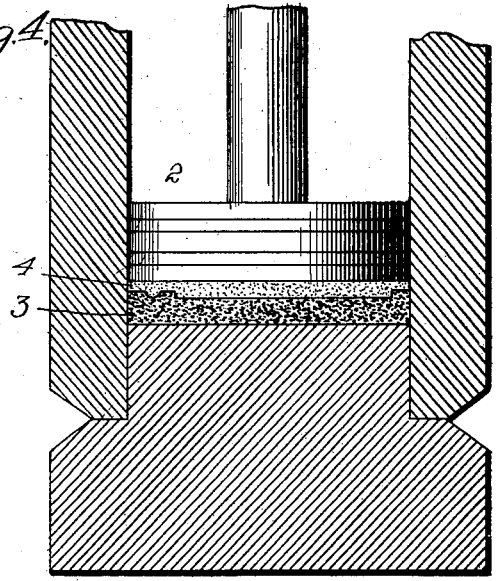
Figure 5:
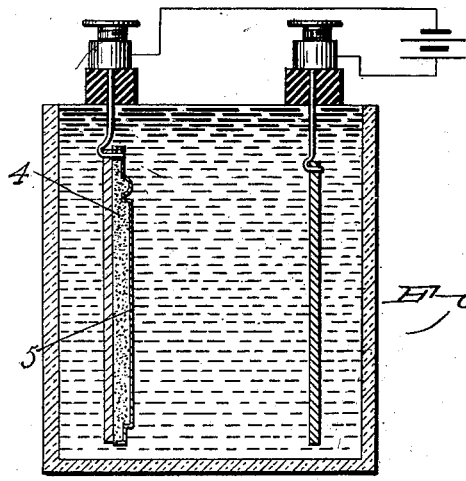
Figure 6:
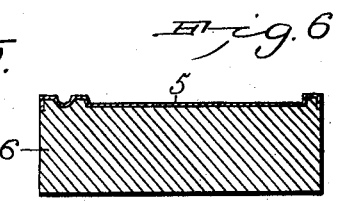

In the accompanying drawings, in which I have illustrated the various steps of my improved method of preparing embossing-molds, Figure 1 is a view showing in perspective an object having a design from which a facsimile is to be produced. Fig. 2 is a view showing in vertical section a conventional press in which the first impression in plastic material is made from said original object. Fig. 3 is a view showing in perspective the plastic material having the first impression. Fig. 4 is a view showing in vertical section a conventional press in which the first plastic impression is used to form the second or counter plastic impression. Fig. 5 is a view in the nature of a diagram showing the manner of making the electroplate-shell from said second or counter impression, and Fig. 6 is a view showing in transverse section an embossing-mold consisting of an electroplate-shell provided with a metal backing made in accordance with my improved method.

In the drawings, 1 indicates the original object; 2, the press; 3, the plastic material used for the first impression; 4, the plastic material used for the counter impression; 5, the electroplate-shell, and 6 the metallic backing for the same.

As a matter of practice I use for plastic material any substance or compound which while sufficiently plastic and smooth when first prepared or exposed to the air will harden after such exposure. In practicing my process I have used wax, which is adapted to receive impressions in great detail and to retain them perfectly, though other plastic materials may be employed instead. It will be understood, however, that this is not of the essence of my invention, which, as already set forth, consists in taking an impression of a design in plastic material, making a counter impression in plastic material from the one first made, making an electroplate shell or matrix from said counter impression in plastic material, and backing said electroplate-shell as a die or mold.

In making the plastic impression and counter impression I usually employ a press to insure evenness and completeness of reproduction; but this is immaterial to the essence of my method and is merely an element of good practice.

Having thus fully described my invention, what I claim as new and useful, and desire to secure by Letters Patent, is—

The method of preparing embossing-molds which consists essentially of making an impression in plastic material of the design to be reproduced, making a counter impression in plastic material of this first impression, making an electroplate-shell from said counter impression, and backing said electroplate-shell for use as a matrix, mold, or die.

In testimony that I claim the foregoing as my own I have hereto affixed my signature in the presence of two witnesses.

EMMETT OLIVER LOVELAND.

Witnesses:
J. HAROLD OLSON,
THOMAS A. SWEARENGIN.